United States Patent Office 3,525,472
Patented Aug. 25, 1970

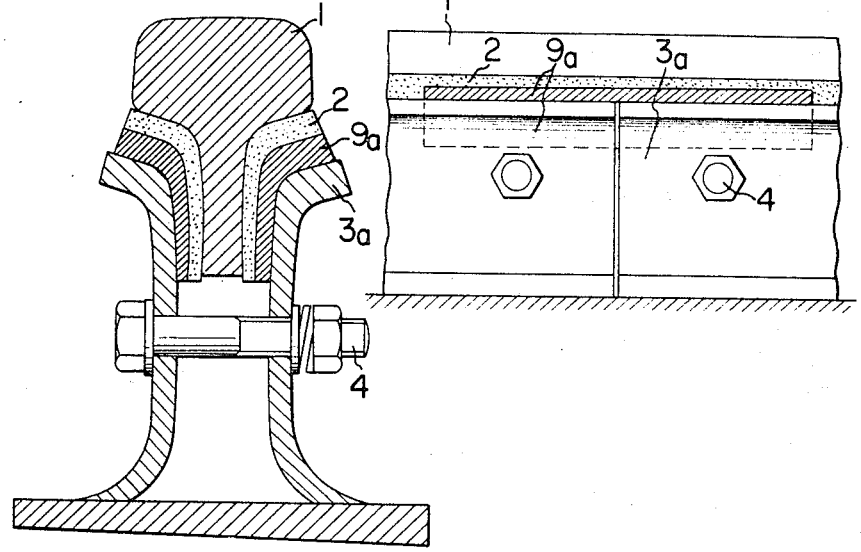
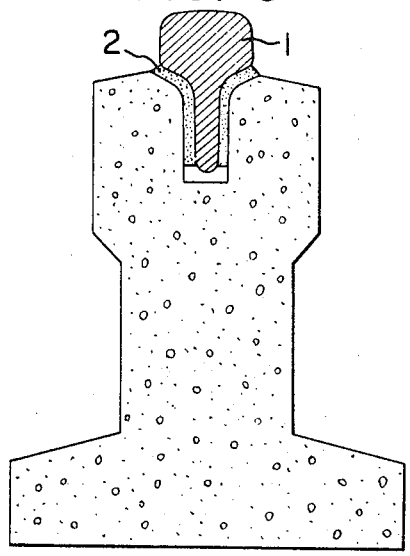
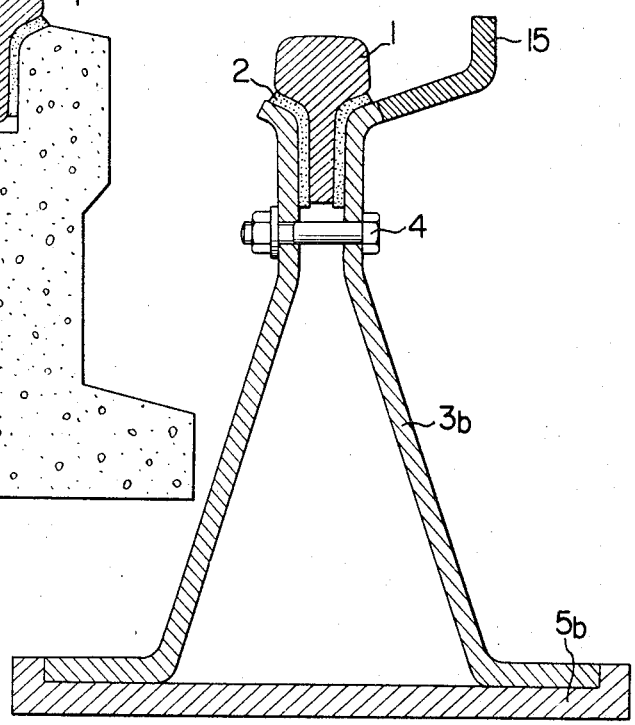

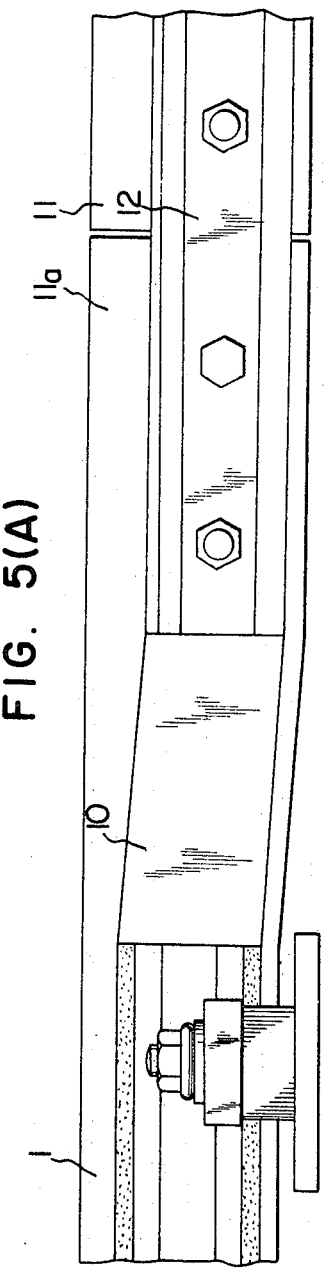
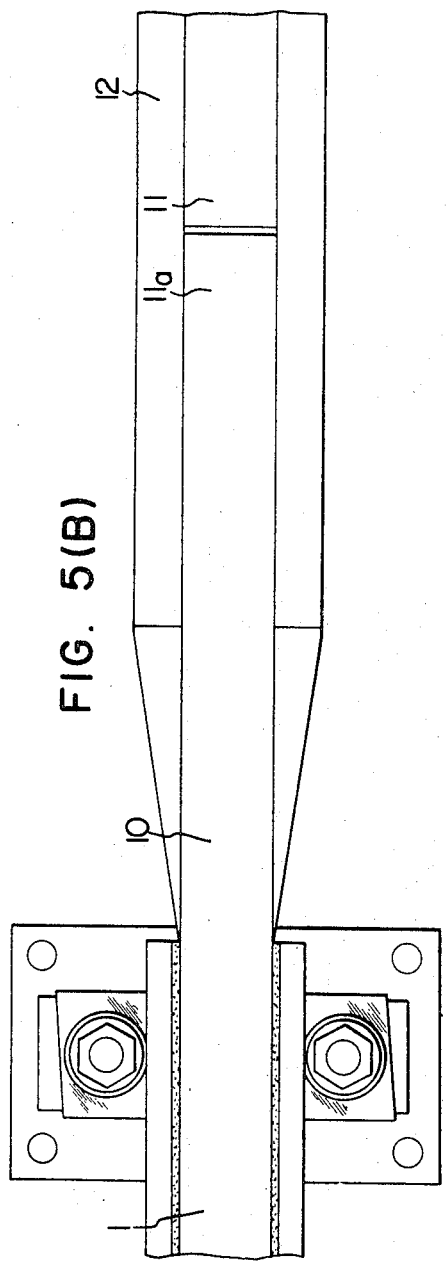
FIG. 5(A)
FIG. 5(B)

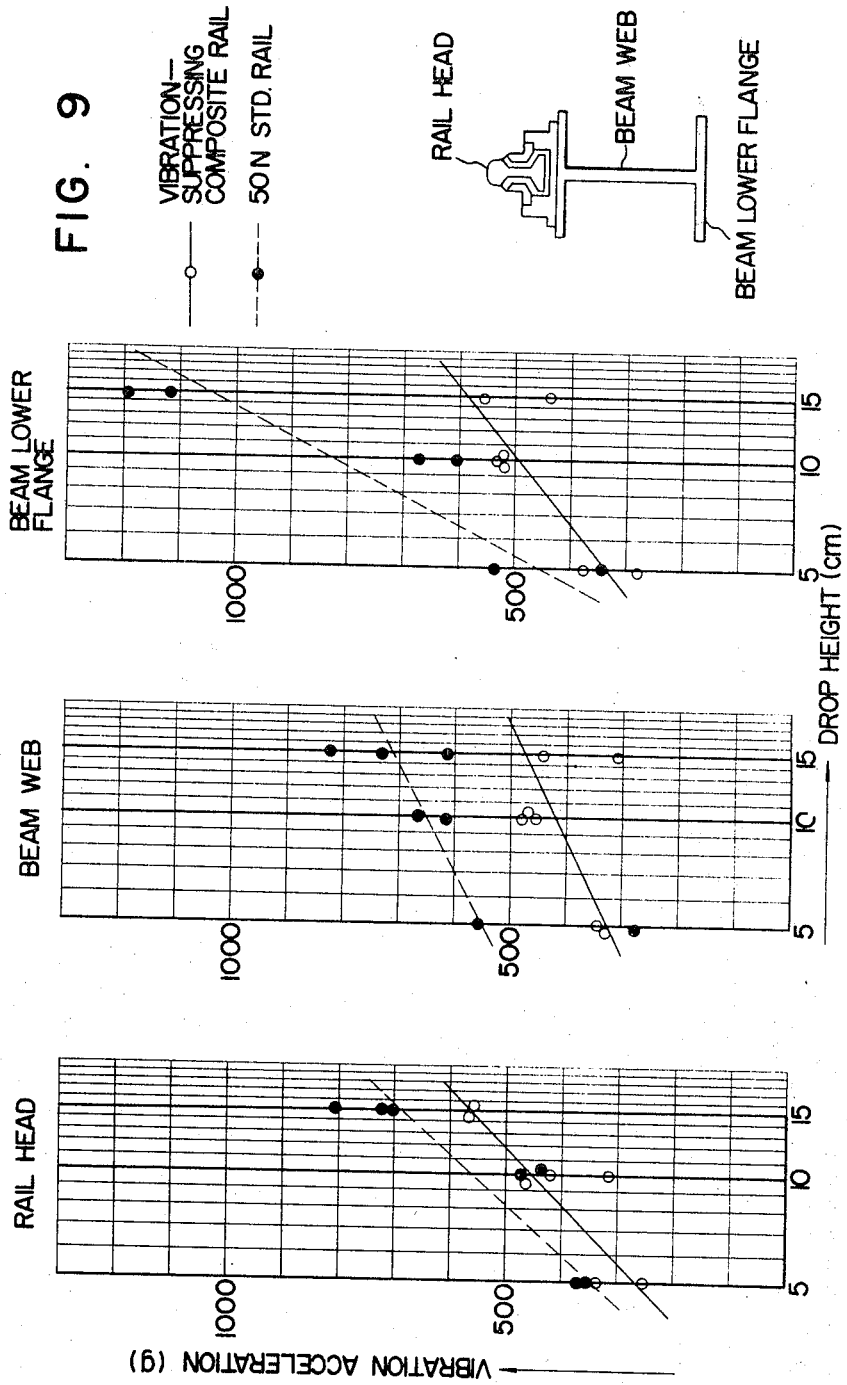

3,525,472
VIBRATION-SUPPRESSING COMPOSITE RAIL FOR RAILWAYS
Yutakam Sato, Tokyo-to, Japan, assignor to Nippon Kokuyu Tetsudo (known in English as Japanese National Railways), Tokyo-to, Japan
Filed Aug. 24, 1967, Ser. No. 663,152
Claims priority, application Japan, Aug. 30, 1966, 41/56,635; Nov. 25, 1966, 41/76,870, 41/76,871; 41/76,872
Int. Cl. E01b *11/16*
U.S. Cl. 238—151    2 Claims

ABSTRACT OF THE DISCLOSURE

An integral rail having a rail head and lower part is sandwiched between two cushion plates having rubber-like elasticity and clamped against respectively opposite sides and lower surfaces of the rail head of the integral rail by a supporting structure, which comprises long clamp plates or web plates tightened together on respectively opposite sides by bolts with nuts, or which comprises a concrete beam with a longitudinal groove along its upper part into which the integral rail is fitted over the cushion plates.

---

Figure 1A:
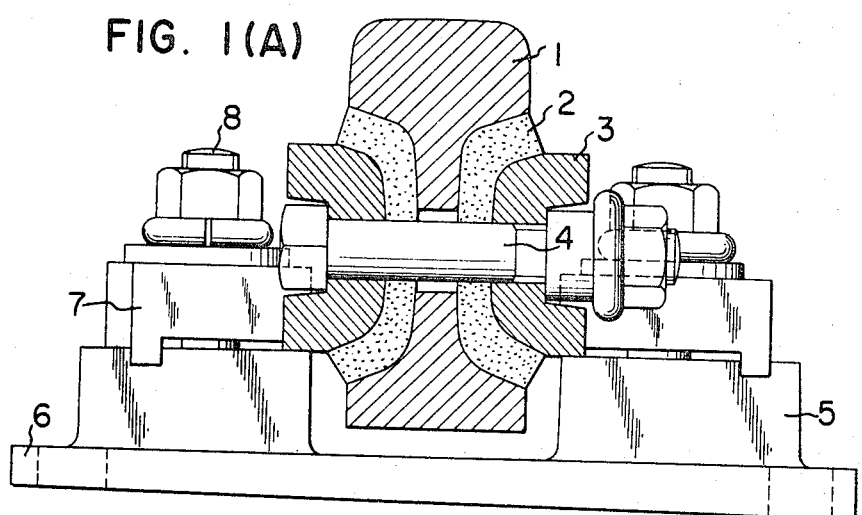

This invention relates to rails for railways and more particularly to a new vibration-suppressing rail of composite construction.

When a railway train runs at high speed on ordinary rails used heretofore, noise of high loudness level is generated, this loudness level becoming extremely high particularly when the train passes steel bridges. Furthermore, even over sections of ordinary ballasted track, the loosening of ballast caused by vibration due to heavy traffic is severe, and, consequently, the periodic interval between ballast maintenance is shortened. In addition, the necessity for elastic rail fastening devices due to installations such as welded rails or so-called "long rails" increases, and this necessity still presents a difficult problem.

Heretofore, various attempts have been made or proposed to reduce noise and vibration related to railway rails. For example, rubber pads have been inserted between the base flanges of ordinary rails and the crossties (sleepers) or tie plates. For such pads to have an appreciable effect in suppressing vibration, they must have substantial thicknesses, but this gives rise to difficulties such as excessive displacement and titlting of the rails due to lateral forces.

According to another proposal, the surfaces of the heads of ordinary rails are covered with an elastic plate of a material such as synthetic rubber. This method, however, has not been practical because of insufficient strength of such covering materials available up to the present time.

Vibration-suppressing composite rails afford a possibility of overcoming the above described difficulties but give rise to other problems relating to the design of rail joints and so-called compromise (or tapered) rails as described more fully hereinafter.

It is an object of the present invention to provide a vibration-suppressing composite rail of relatively simple construction in which the above described difficulties are overcome.

Another object of the invention is to provide a simple method and means for constructing joints between the composite rail of the invention.

Still another object of the invention is to provide a so-called compromise rail for joining the composite rail of the invention to a conventional rail.

A further object of the invention is to provide a vibration-suppressing composite rail having substantial height and foot width for high rigidity and strength and having a principal beam structure made of double web plates or of concrete.

An additional object of the invention is provide a vibration-suppressing composite rail provided with a guard rail and trough for derailment prevention of simple construction by merely extending the upper part of the inner web plate of a track.

According to the present invention, briefly summarized, there is provided a vibration-suppressing composite rail for railways comprising an integral rail having a rail head and lower part, cushion plates made of a material having rubber-like elasticity and disposed on respective opposite sides of the rail and under the lower surfaces of the rail head, and a support structure clamping the cushion plates from both outer sides and supporting the integral rail with the cushion plates interposed therebetween.

The nature, details, and utility of the invention will be more clearly apparent from the following detailed description with respect to preferred embodiments of the invention when read in conjunction with the accompanying drawings, in which like parts are designated by like reference numerals.

Figure 1B:
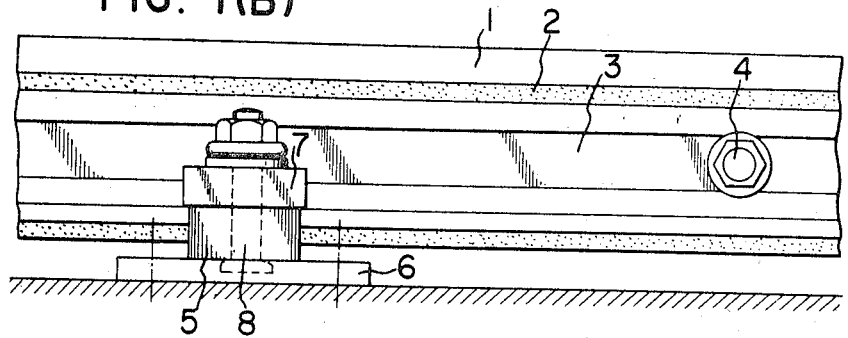
Figure 2A:
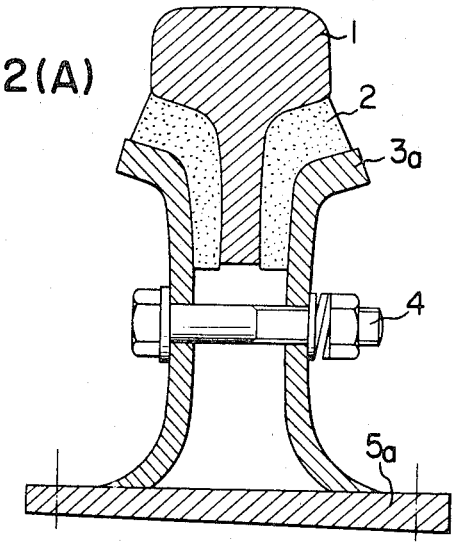
Figure 2B:
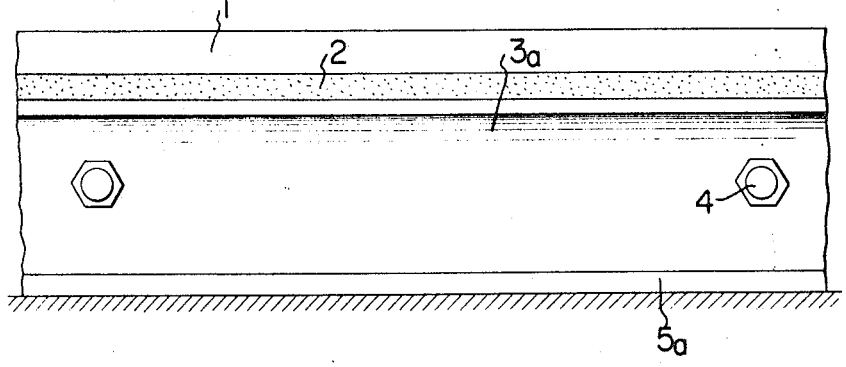
Figure 3A:
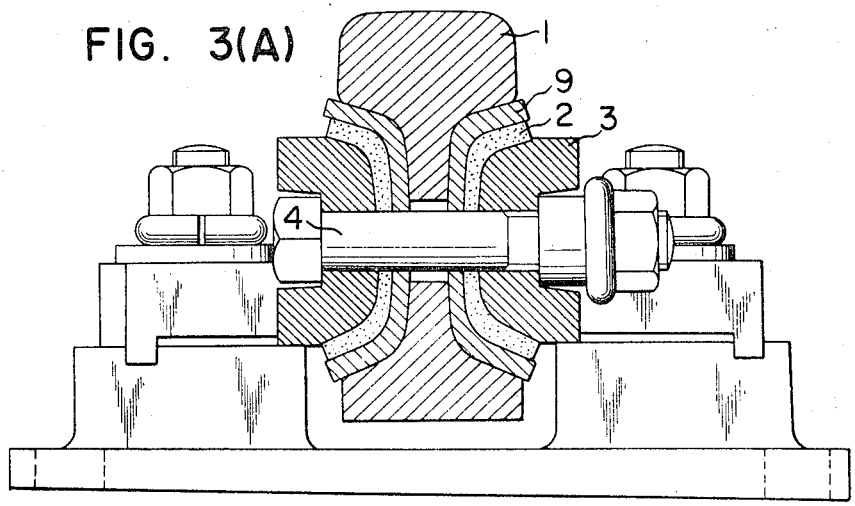
Figure 3B:
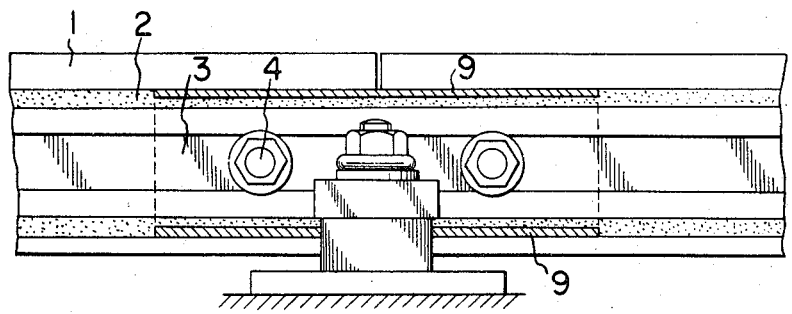
Figure 6A:
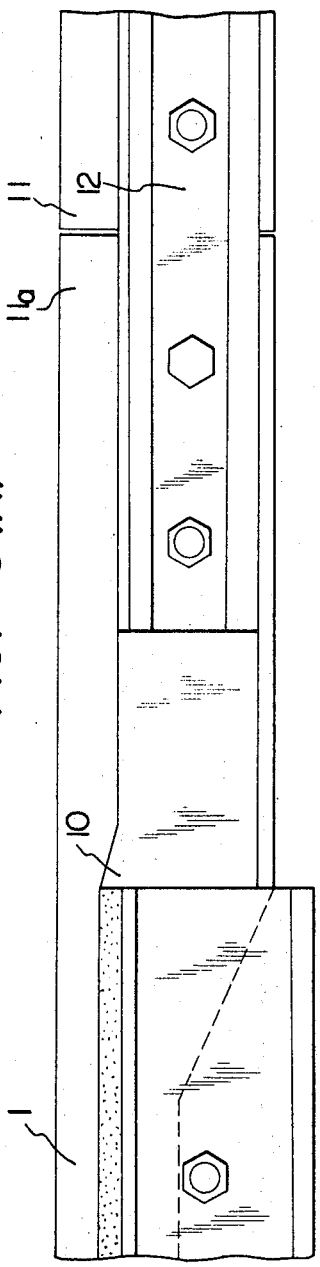
Figure 6B:
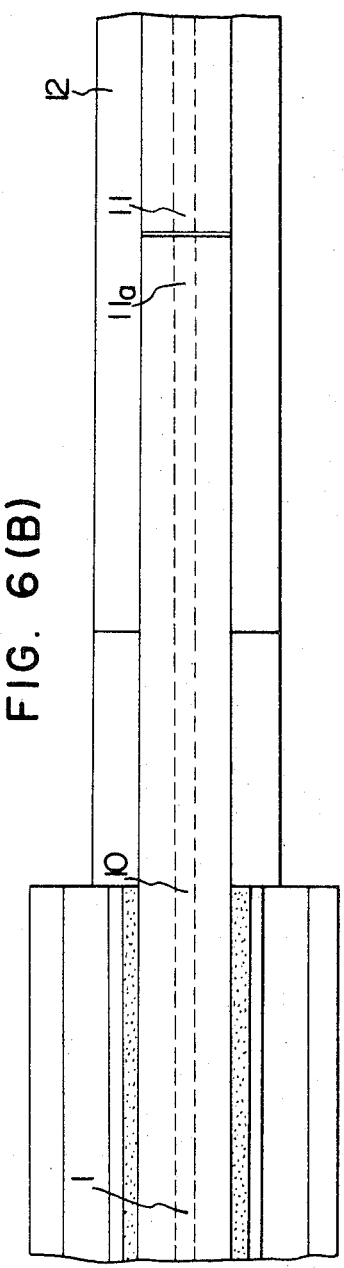

In the drawings:

FIGS. 1(A) and 1(B) are respectively an end elevational view, partly in cross section, and a fragmentary side elevational view showing one example of a vibration-suppressing composite rail and its supporting means according to the invention;

FIGS. 2(A) and 2(B) are views similar to FIGS. 1(A) and 1(B) showing another example of embodiment the invention;

FIGS. 3(A) and 3(B) are respectively an end elevational view, partly in cross section, and a side elevational view showing one example of construction of a joint in a vibration-suppressing composite rail according to the invention;

FIGS. 4(A) and 4(B) are views similar to FIGS. 3(A) and 3(B) showing another example of construction of a rail joint;

FIGS. 5(A) and 5(B) are respectively side elevational and plan views showing one example of method of joining a compromise (or taper) rail for vibration-suppressing composite rails of the invention;

FIGS. 6(A) and 6(B) are similar views showing another example of method of joining a compromise rail;

FIGS. 7 and 8 are end elevational views, in cross section, respectively showing other examples of vibration-suppressing composite rails according to the invention; and FIG. 9 is a graphical representation indicating the results of a comparative wheel-set drop test on a composite rail of the invention and a standard 50 N rail.

Referring to FIGS. 1(A), 1(B), 2(A), and 2(B), reference numeral 1 designates an integral rail, particularly its rail head. The rail 1 is sandwiched between and held by cushion plates 2 made of a vibration-suppressing material with rubber-like elasticity such as natural or synthetic rubber. The cushion plates 2 are clamped against the web side surfaces and lower surfaces of the head of the rail 1 by long clamp plates 3 (in the construction shown in FIGS. 1(A) and 1(B)) or long web plates 3$_a$ (in the construction shown in FIGS. 2(A) and 2(B)) which are held against the outer flanks of the cushion plates by clamp bolts 4 provided with respective washers and nuts.

The clamp plates 3 of the above described assembly are supported on support blocks 5 (FIGS. 1(A) and 1(B)), and the web plates 3$_a$ are supported on a long foot plate 5$_a$ (FIGS. 2(A) and 2(B)). In the construction illustrated in FIGS. 1(A) and 1(B), the clamp plates 3 are held in mounted position by the combination of holding blocks 7 for shiftable adjustment and anchor bolts 8 with respective washers and nuts, each bolt 8 being fixed at its head to a tie plate 6 and passed upward through a respective support block 5 and holding block 7. In the construction illustrated in FIGS. 2(A) and 2(B), the lower edges of the web plates $3_a$ are secured to the foot plate $5_a$ by a method such as welding.

By the above described construction, the flexibility required for the trackway is amply afforded in a freely adjustable manner by the cushion plates 2. Moreover, by the construction illustrated in FIGS. 2(A) and 2(B), a composite rail of the same height and foot width as existing rails can be fabricated and used interchangeably with existing rails.

The vibration-suppressing composite rail of the above described construction according to the invention has the following advantageous features.

(1) In contrast to ordinary rails provided with rubber pads under their foot flanges, as mentioned hereinbefore, the composite rail of the invention can be made to have substantially low magnitudes of lateral displacement and tilting and yet have amply high elasticity in the vertical direction.

(2) In contrast to a rail with elastic material covering on the surface of its head as proposed heretofore, the composite rail of the invention receives the force of wheels directly on its head and, therefore, is not accompanied by any problem of strength of the elastic cushion material.

(3) Since the cushion plates of the composite rail, in almost all cases, are made of electrically insulating material, there is no need for consideration with respect to special electrical insulation for the vibration-suppressing composite rail.

(4) By the application of the composite rail of the invention, trackways of new construction type can be readily and practically realized.

The present invention further provides a method and means for joining adjacent lengths of the composite rail. The vibration-suppressing composite rail, which has cushion plates (for example, 2) interposed between the integral rail 1 and the supporting members (for example, 3 or $3_a$) as described above, presents no problem along the greater part of one length of the rail. However, at the rail joints and at the joint parts of the clamp plates or web plates, the impact forces imparted thereto tend to be large, whereby the sinking of particularly the rail at the rail joints is of large magnitude.

The present invention contemplates overcoming this difficulty by providing a joint construction of high rigidity for vibration-suppressing composite rails wherein, at each joint, metal members are interposed between the rail 1 and the cushion plates or between the cushion plates and the clamp plates or web plates thereby to provide reinforcement and prevent sinking of rail at the joint without changing the cross section of the clamp plates or web plates.

Referring to FIGS. 3(A), 3(B), 4(A), and 4(B), metal members 9 (or $9_a$) constitute reinforcement plates interposed between the integral rail 1 and cushion plates 2 or between cushion plates 2 and clamp plates 3 (or web plates $3_a$) and functioning somewhat similarly as fishplates. The cross section of each cushion plate 2 over a suitable distance thereof at the joint is reduced in thickness, and the metal member 9 (or $9_a$) is thus interposed at this reduced part of the cushion plate 2. The parts thus assembled are clamped securely by clamp bolts 4 on respective sides of the joint, whereby a joint of the vibration-suppressing composite rail is formed.

There are two kinds of joints of the vibration-suppressing composite rail, that is, a joint between adjacent lengths of the integral rail 1 and a joint between adjacent lengths of clamp plates 3 (or web plates $3_a$). FIGS. 3(A) and 3(B) illustrate an example of a joint between adjacent lengths of the integral rail 1. For this joint, the metal plates 9 are placed on the side of rail 1, but in the case of a joint between adjacent lengths of clamp plates 3 (or web plates $3_a$), the metal plates 9 are placed on the side of clamp plates 3 (or web plates $3_a$). FIGS. 4(A) and 4(B) illustrate an example of a joint between adjacent lengths of web plates $3_a$, but the metal plates 9 can be similarly placed on the side of rail 1 to form a joint between adjacent lengths of the rail 1.

The present invention further provides a compromise (or tapered) rail for the vibration-suppressing composite rail. While compromise joints used heretofore have involved the joining of rails of mutually similar cross sectional profiles, the forming of compromise joints in the case of vibration-suppressing composite rails presents some difficulties. One difficulty is that, while the heads of the rails to be joined may be of identical shape, the lower part of each integral rail may not exist or the lower part of one rail may differ in shape from that of the other rail. Another difficulty is that, since cushion plates are sandwiched between the rail web part and clamp plates or web plates, the rails cannot be joined directly as was heretofore possible.

The present invention, in still another aspect thereof, contemplates the provision of a compromise rail for the composite rails of the invention. In the case where a composite rail of different configuration is to be joined to an ordinary rail by this compromise rail, a transition section is secured by a method such as welding to the rail of different configuration and is connected to the ordinary rail by means of ordinary fishplates.

Two examples of compromise rails according to the invention are illustrated in FIGS. 5(A), 5(B), 6(A), and 6(B). In each example, a vibration-suppressing composite rail 1 according to the invention is joined to an ordinary rail 11 by the combination of a transition section 10, an ordinary rail section 11a, and an ordinary fishplate 12. As shown in FIGS. 5(A) and 6(A), it is possible, when joining a vibration-suppressing composite rail 1 and an ordinary rail 11, to provide a compromise joint by inserting a transition section therebetween.

In a conventional compromise rail, it has been possible to join rails of mutually similar cross sections by merely securing the transition section to the rail of larger cross section by a method such as welding. According to the present invention, the transition section is secured by a method such as welding to the rail of smaller cross section and joining the rails at a part consisting of ordinary rails 11a and 11 by means of an ordinary fishplate 12.

While the shapes of the transition section 10 differ in the two examples as is observable from a comparison of FIGS. 5(B) and 6(B), this difference is caused by a difference in the shapes of the respective composite rails 1. Furthermore, while various arrangements are for mounting on cross ties (sleepers) are possible, the compromise rail of the invention does not present any problem with respect to any of these arrangements.

For certan sections of a trackway such as a straightway section, it is also possible to form the vibration-suppressing composite rail of the invention as a beam of high rigidity and strength so that it can be supported at points which are spaced several yards apart. Furthermore, by extending the web plate 3b on the inner side of the track in a diagonally upward direction and then in a vertically upward direction as illustrated in FIG. 7, it is possible to form a derailment prevention rail 15.

In a further embodiment of the invention as illustrated in FIG. 8, the composite rail is formed as a beam of concrete which may be used in place of a steel beam built up of web plates $3_b$, clamp bolts 4, and a foot plate $5_b$.

Various experiments and tests are now being carried out on experimental specimens of the vibration-suppressing composite rail according to the invention. While these experiments and specimens have not been completed, preliminary results obtained so far indicate the effectiveness of the composite rail of the invevntion in suppressing vibration and noise.

One example of these preliminary results, as set forth herebelow, relates to measurements of acceleration of vibration resulting from a wheel-set drop test, in which a composite rail according to the invention and a 50 N rail for comparison were laid on a steel bridge and respectively subjected to a wheel drop test during which the accelerations of vibration occurring at various parts of the two rails were measured and compared.

A composite rail of the invention and a 50 N rail each of a length of 3.7 metres were respectively laid on a steel plate girder of a length of 4 metres. The composite rail was anchored to the steel girder by means of special mounting devices as described hereinbefore, while the 50 N rail was anchored to the steel beam by fixing standard F-type tie plates at the same positions as the mounting devices of the composite rail by means of elastic tightening devices.

A wheel-set (of a weight of 1 metric ton) was dropped on approximately the middle part of each rail from drop heights of 5 cm., 10 cm., and 15 cm., and the accelerations of the resulting vibrations were measured by means of barium titanate pickups attached respectively to the rail head, the girder web, and the girder lower flange or foot.

The results of this test, as indicated graphically in FIG. 9, were as follows.

(1) At all points of measurment (i.e., rail head, girder web, and girder lower flange), the composite rail of the invention exhibited lower values of vibration acceleration than the reference 50 N rail.

(2) The difference between the values of vibration acceleration of the two rails was small at the rail head and large at the girder lower flange. At the girder web, the results at which are important from the viewpoint of noise, the composite rail exhibited vibration accelerations which were approximately 40 percent less than those of the 50 N rail.

It should be understood, of course, that the foregoing disclosure relates to only preferred embodiments of the invention and that it is intended to cover all changes and modifications of the examples of the invention herein chosen for the purposes of the disclosure.

What I claim is:

1. A vibration-suppressing railway rail assembly comprising: a first railway rail having a head portion for supporting vehicular loads and a lower portion connected to said head portion; and a cushioning means in contact with at least one side of said lower portion of said railway rail and extending substantially the entire longitudinal length thereof for attenuating noise and absorbing vibrations; and including a second railway rail extending longitudinally of said first rail and having a different cross section than said first railway rail, and linking means for linking said first railway rail to said second railway rail.

2. A rail assembly according to claim 1; wherein said linking means comprises a compromise railway rail having a first section of the same cross-sectional shape and dimension as said conventional railway rail, and a transition section having a cross-sectional shape and dimension progressively varying in the longitudinal direction from those of said railway rail to those of said first section of the compromise railway rail.

References Cited

UNITED STATES PATENTS

| | | | |
|---|---|---|---|
| 3,383,043 | 5/1968 | Tew | 238—283 |
| 469,392 | 2/1892 | Price | 238—131 |
| 500,688 | 7/1893 | Esmond | 238—131 |
| 1,386,863 | 8/1921 | Harrington | 238—152 |
| 2,779,543 | 1/1957 | Gronlund | 238—283 |
| 3,013,725 | 12/1961 | Lees | 238—382 |
| 3,201,046 | 8/1965 | Ferguson | 238—152 |

FOREIGN PATENTS 777,613 12/1934 France.
865,911 2/1953 Germany.

ARTHUR L. LA POINT, Primary Examiner
R. A. BERTSCH, Assistant Examiner

U.S. Cl. X.R.
238—175, 243, 382